United States Patent

Dimitroff

[15] 3,640,659
[45] Feb. 8, 1972

[54] SPLIT DIE FOR EXTRUDING LAMINATED TUBING

[72] Inventor: Dimiter V. Dimitroff, New York, N.Y.
[73] Assignee: Bristol-Myers Company, New York, N.Y.
[22] Filed: Aug. 1, 1968
[21] Appl. No.: 749,431

[52] U.S. Cl..............................................425/133, 425/463
[51] Int. Cl.......................................................B29d 23/04
[58] Field of Search....................18/14 P, 14 G, 13 P, 30 JT, 18/13 H, 14 RR, 13 RR, 14 S

[56] References Cited

UNITED STATES PATENTS

| | | | |
|---|---|---|---|
| 2,753,596 | 7/1956 | Bailey | 18/14 P |
| 2,501,690 | 3/1950 | Prendergast | 18/13 P X |
| 3,184,358 | 5/1965 | Utz | 18/14 P |
| 3,461,197 | 8/1969 | Lemelson | 18/13 P X |

*Primary Examiner*—Robert D. Baldwin
*Assistant Examiner*—B. D. Tobor
*Attorney*—William F. Moss, III, David J. Mugford and Irving Holtzman

[57] ABSTRACT

A split die with inner and outer dies having concentrically arranged extrusion orifices. The inner and outer dies being spaced from each other to provide an insulating space whereby a temperature gradient may be maintained between said inner and outer dies during the extrusion process.

6 Claims, 7 Drawing Figures

INVENTOR
DIMITER V. DIMITROFF

INVENTOR
DIMITER V. DIMITROFF
BY
ATTORNEY

SPLIT DIE FOR EXTRUDING LAMINATED TUBING

This invention relates to a novel die which is useful in the continuous extrusion of seamless, laminated, plastic tubing. More particularly, it is concerned with a device of the above-mentioned type which makes possible the formation of seamless, laminated, plastic tubing having an inner layer made of a plastic material having a melting point which is substantially different from that which is used to make an outer layer of the tubing.

In the fabrication of plastic tubing (particularly tubing which is designed to eventually be formed into containers for storing and dispensing materials, e.g., toothpastes, cosmetic creams, etc.) it is often necessary to prepare plastic tubes having a laminated structure. This is required because of some particular shortcoming in the properties of the materials employed. Thus, for example, polyethylene, which has excellent physical properties as to strength and vapor permeability, is not compatible with certain fluoride dentifrice products. It is, therefore, not possible to use this material alone in tubes intended for use in these dentifrice products.

To compensate for this shortcoming, it would be highly desirable to be able to take advantage of the beneficial and compensatory properties of other plastic material, e.g., polyvinylidene chloride (saran) by way of forming a laminated structure of polyethylene and the polyvinylidene chloride. However, a problem is presented in the extrusion-laminating of different materials into a laminated tube. This is often due to the fact that the optimum extrusion temperatures are quite different for the respective materials. This difference is often so large that the optimum extrusion temperature of one material is often high enough to destroy the beneficial characteristics or decompose (oxidative heat degradation) the other plastic material during the tube extrusion-laminating procedure.

It has now been found that laminated, seamless, plastic tubing comprising at least two layers of plastic materials having substantially different melting points can be made by using a split die in which a substantial temperature gradient is maintained between the two plastic materials being extruded. This is preferably accomplished by providing an insulating gap between the portions of the die from which each of the separate seamless tubes to be laminated is extruded.

It is, accordingly, an object of the present invention to provide an extrusion die suitable for making laminated, seamless, plastic tubing having at least two layers in which the melting point of the respective plastic materials used in making the separate layers is substantially different.

It is a further object of the present invention to provide an extrusion die for making seamless, laminated, plastic tubing in which a temperature gradient may be maintained between the various layers of plastic material during extrusion.

It is still a further object of the present invention to provide a method for making a laminated, seamless, plastic tubing in which at least two of the layers are made of material having a substantially different processing temperatures.

Other and more detailed objects of this invention will be apparent from the following description, claims and drawings wherein:

Figure 1:
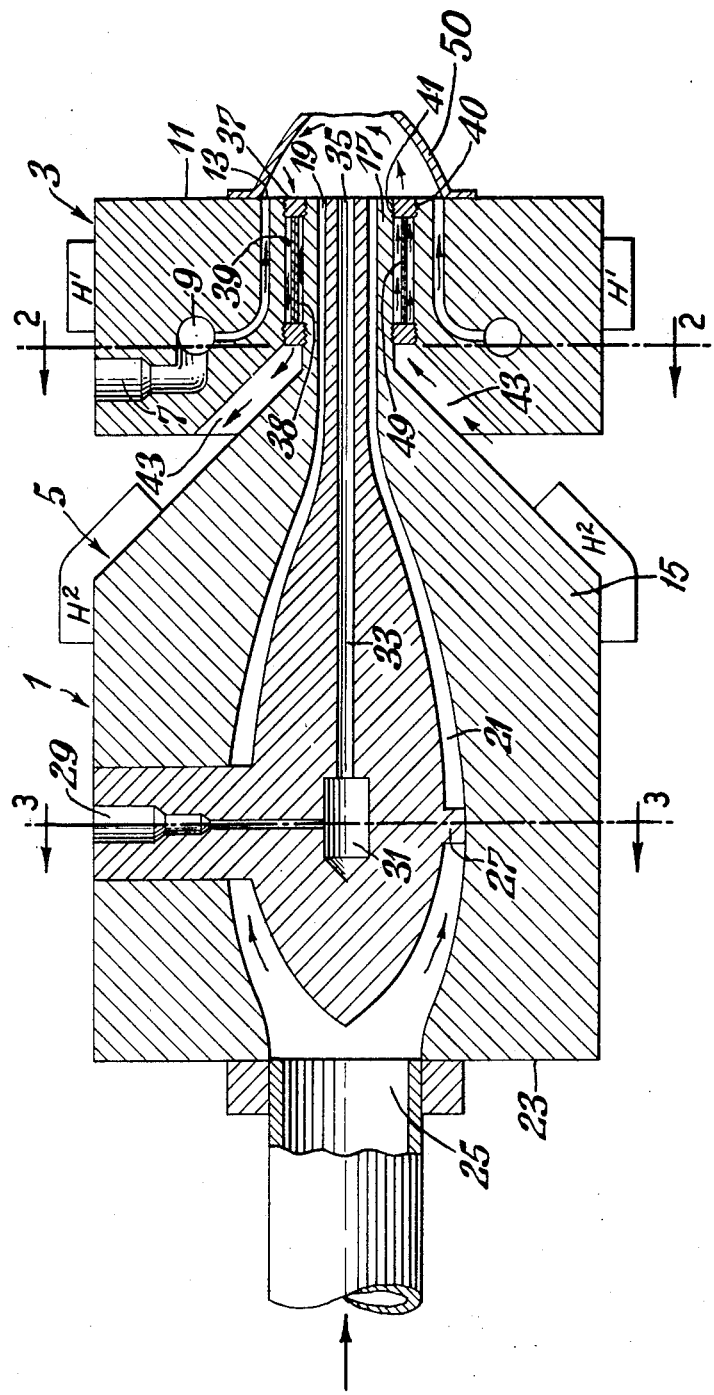
FIG. 1 is a longitudinal sectional view taken through the medium line of a die embodied in the present invention.
Figure 2:
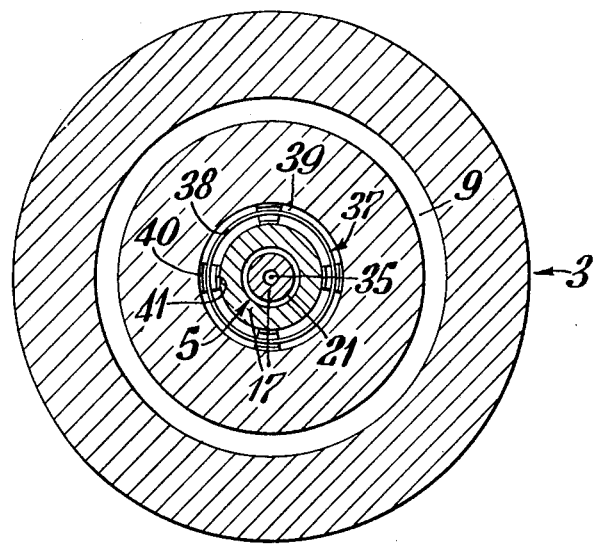
FIG. 2 is a longitudinal sectional view taken along line 2—2 of FIG. 1.

In the U.S. Pat. No. 3,184,358 to Utz, there is described a method and a die which is useful in forming laminated plastic tubing. Utz describes a method which comprises extruding at least two tubular formations of different thermoplastic materials in concentric arrangement and provides for the introduction of a reactive gas between the layers to facilitate the bonding of the layers. However, no provision is made in the Utz device or process for maintaining a temperature gradient between the two layers of the laminate as they are being extruded through the die. Thus, in Example 1, the patentee states that the die assembly is heated to a temperature of about 240° to 260° C., no effort being made to maintain the different materials at different temperatures. The patentee further states that the two tubes immediately upon extrusion in this example have the same temperature.

The Utz device does not provide a solution to the problem which the present invention seeks to solve. Thus, it does not provide a device or a method which is adapted to form seamless, laminated, plastic tubing, wherein the materials used to form the respective layers have substantially different melting points.

The Prendergast U.S. Pat. No. 2,501,690 also describes a die and a method for making multiple-layer plastic conduits. However, as in the case of the Utz patent, Prendergast does not provide a system wherein a temperature gradient is maintained between the two layers of material being extruded, and accordingly, it may not be used in forming laminated tubes from materials having a substantial difference in melting point.

The Field et al. U.S. Pat. No. 2,957,201 also relates to an extrusion die for the preparation of 2-ply seamless, plastic tubing. In accordance with the Field et al. patent, two layers of the same material are simultaneously and concentrically extruded from a diehead. The material to be extruded is first introduced into a common channel for the material. The stream of plastic material is then divided into two branches, each leading to a separate but concentrically arranged circular orifice. Each of the branches are separated from each other by a substantially solid separator which forms one wall for each of the separate channels of plastic material being extruded. The Field et al. device obviously also is not adaptable to the extrusion of two different types of plastic material. Furthermore, no provision is made for the maintenance of a temperature gradient between the two tubes of material that are being extruded.

Referring now to the drawings in which the same numerals designates the same structure in the various views, a split die encompassed in this invention is shown generally at 1 and comprises an outer die 3 and an inner die 5. Outer die 3 is provided with a first vertical channel 7 which is bored through its upper surface and which communicates at its inner end with annular channel 9. Annular channel 9 curves inwardly and forwardly toward the front face 11 of the die and terminates in said front face 11 as outer annular orifice 13. The latter serves as the extrusion orifice for the material which is destined to constitute the outer layer of the laminated tube made with the present device.

Inner die 5 comprises a relatively large rear section 15 which tapers forwardly and inwardly and terminates in a small front section 17. Front section 17 is arranged concentrically with regard to outer die 3 and is provided with inner annular orifice 13.

Figure 3:
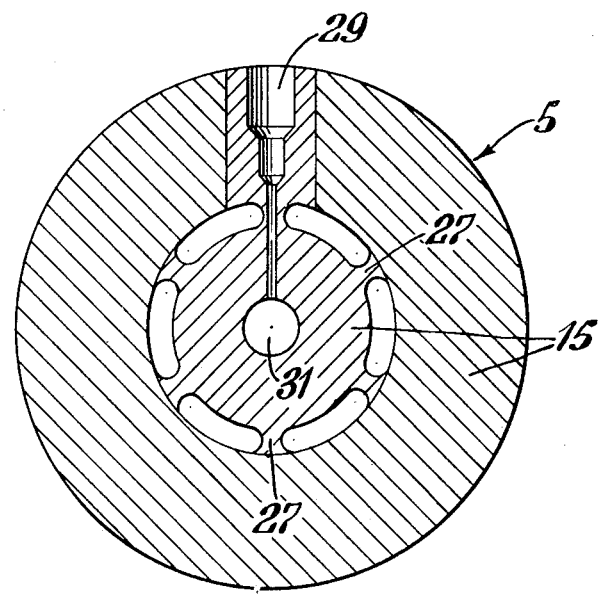
FIG. 3 is a longitudinal sectional view taken along line 3—3 of FIG. 1.

Inner annular orifice 19 constitutes the forward exit port of conduit 21 which extends from the rear face 23 of inner die 5 to the front die face 11. The material to be extruded, and to constitute the inner layer of the laminated tube, is introduced into conduit 21 through the rear port 25 of the rear section 15 of the inner die 5. To insure the proper mixing and distribution of the plastic material as it passes through conduit 21, there is provided a plurality of baffles 27 that extend across annular conduit 21. These are best seen in FIG. 3. The stream of plastic material as it flows through conduit 21 is broken up by baffles 27 into a plurality of streams which are joined together again at the exit side of the baffles.

To provide means for introducing air into the interior of the tubing during the extrusion process, a second vertical channel 29 is bored through the top or rear section 15 of inner die 5. The inner end of vertical channel 29 communicates with chamber 31 which in turn communicates with horizontally disposed conduit 33. The latter terminates in an orifice 35 which is arranged concentrically with respect to annular orifices 19 and 13.

The front section 17 of the inner die 5 is maintained in spaced relationship from outer die 3 by means of the separator 37. Separator 37 forms an airgap 39 between outer and inner die 3 and 5 respectively.

Figure 4:
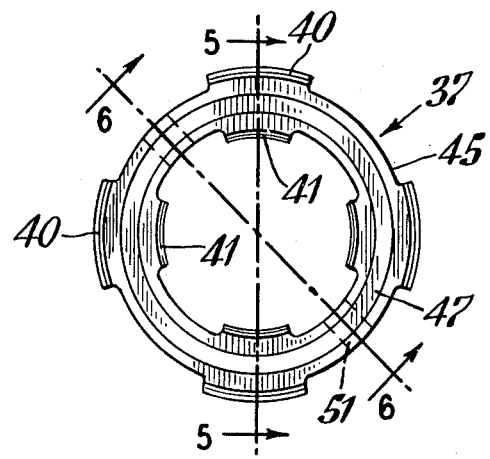
FIG. 4 is a front elevation of a separator element embodied in the present invention.
Figure 5:
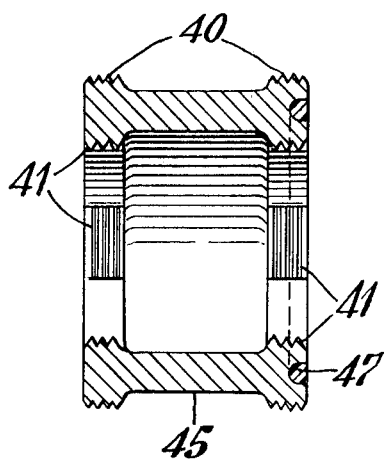
FIG. 5 is a longitudinal sectional view taken along line 5—5 of FIG. 4.
Figure 6:
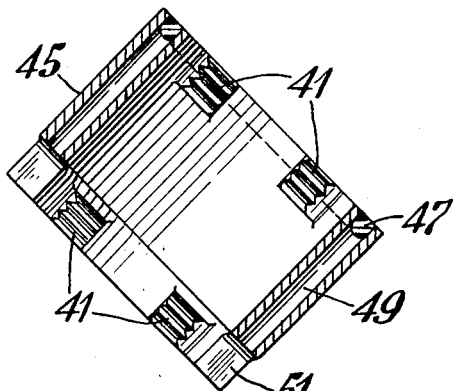
FIG. 6 is a cross-sectional view of FIG. 4 taken along line 6—6.
Figure 7:
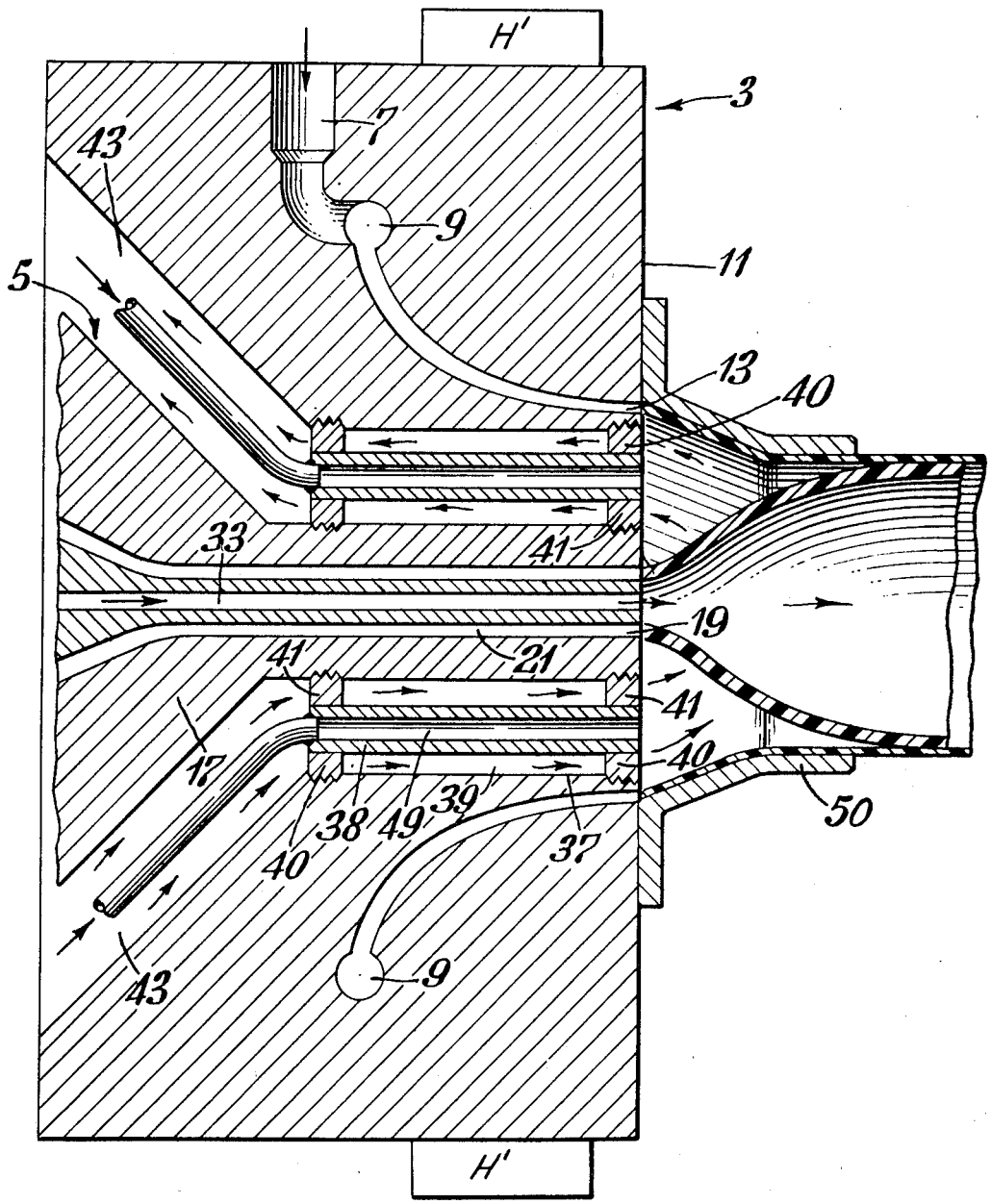
FIG. 7 is an enlarged view, in section, of the die embodied in this invention as shown in FIG. 1.

The details of separator 37 are best seen in FIGS. 4 to 6 which are enlarged views of the same. Its relative position of separator 37 in the die is best seen in FIG. 7. The separator comprises a cylindrical portion 38 provided with four outer and four inner lugs, 40 and 41 respectively, radially disposed at each end of said cylinder. Each of the lugs is threaded and designed to mate with corresponding threaded area on outer and inner dies 3 and 5 respectively.

The front face 45 of separator 37 is provided with an annular groove in which is seated removable sealing ring 47. This serves, if desired, to seal off the outer openings of conduits 49 which are bored through the length of the wall of cylinder 38. In FIG. 7, the sealing ring 47 is removed. Conduits 49 may be used to introduce reactive gases into the area between each of the tubes of plastic material during the extrusion process. The back end of conduits 49 open into slotted portions 51 that are provided at the back end of cylinder 38.

In assembling the split die of this invention for use, the separator 37 is screwed into the front section 17 of inner die 5. As mentioned above, threaded areas of front section 17 mate with the threaded portions of the inner lugs 41 of the separator 37. Because of the protuberances which are formed by the inner lugs 41 and the threaded areas of the front section 17 of inner die 5, the inner wall of cylinder 38 is maintained in spaced relationship from the outer surface of front section 17 of inner die 5 and thus forms part of the airgap 39 mentioned above.

In a similar manner, outer die 3 is screwed on to separator 37 when the latter is in place. In this instance, the threaded portions of outer lugs 40 on the outer wall of cylinder 38 mate with corresponding threaded areas and the inner surface of outer die 3. Again in a similar fashion, the upper portion of airgap 39 is formed between the outer surface of cylinder 38 and the inner surface of the outer die 3.

During operation, air is free to circulate through space 43 between inner and outer dies 3 and 5 respectively then into airgap 39; then out through the airgap orifice in front of die face 11. After entering the space in front of the die face 11 between the tubes being extruded from orifices 13 and 19 respectively, the air may then circulate back through airgap 39 and space 43. This circulation is best seen in FIG. 1 and 7 wherein the flow of air is shown by a series of small arrows. Where desirable, an extra cooling medium in the form of a gas or liquid may be circulated through the same circuit.

The airgap 39 may also serve another function, i.e., it provides a means for bleeding off the gases generated by the hot melts that are being extruded. These gases collect between the individual tubes that are being extruded in the space in front of the die face 11. This prevents the buildup of pressure, which would otherwise be so large as to cause the tube to burst.

In an alternative construction and mode of operation for short runs, an insulating material may be packed into airgap 39. Any suitable material may be used for this purpose, e.g., asbestos, glass cloth, etc. In this case, the insulating material itself will serve to maintain a temperature gradient between the two dies 3 and 5. In this case, conduit 49 may serve as a means for bleeding off gases generated by the hot melts which collects between the tubes being extruded.

The split die of the present invention, as noted above, is particularly suitable for the extrusion of plastic-laminated tubes wherein the respective layers of the laminate are made of materials which have a marked difference in melting point and processing temperatures. It is especially useful in the extrusion of such materials wherein the extrusion temperature of one of the materials is high enough to destroy or otherwise have a deleterious effect on the other material being extruded.

In general, however, it is useful in any tube extrusion-laminating process wherein a substantial temperature gradient is to be maintained between the materials to be extruded. This gradient can vary widely depending on the materials employed. In typical cases, this gradient might be as little as 10° C. and may extend up to about 200° C.

A typical example of this kind would be the formation of an extruded laminated tube wherein the outer layer of the tube is polyethylene and the inner layer is polyvinylidene chloride. In extruding a laminated tube of this character, the polyethylene melt is introduced into outer die 3 through first vertical channel 7. Simultaneously, the polyvinylidene chloride polymer, also in molten form, is introduced through rear part 25 of inner die 5. At the same time, air under pressure, is pumped through second vertical channel 29. The polyethylene melt is maintained in fluid form in outer die 3. However, although outer die 3 is kept at an elevated temperature by heater H1, this temperature is generally below the melt temperature of the resin as it is extruded from the die. This usually amounts to about 10° to 50° below the melt temperature depending on the materials employed. This differential is maintained so that the resin melts may be extruded at the proper extrusion temperature. In its passage through the die, additional heat is generated in the plastic resin by virtue of the mechanical manipulation of the material. This is over and above the heat that may be absorbed from the die merely as a result of the temperature at which the die is maintained. To make allowances for the extra heat thus generated, the die temperature is maintained below the proper melt temperature of the resin as it is extruded.

In a similar manner, the polyvinylidene chloride polymer is maintained in fluid condition in inner die 5. Also, in a similar manner, inner die 5 is kept at an elevated temperature by heater H2, but at a temperature below the melt temperature of the polyvinylidene chloride polymer for the same reasons discussed above in connection with the extrusion of the polyethylene.

During the extrusion of the tubes, air under pressure issues from orifice 35. This serves to force the two tubes being extruded into contact with each other to cause them to form a laminated structure. This is further facilitated by the truncated conically shaped guide 50, which directs and urges the outer tube inwardly toward the inner tube to insure the bonding of the two to form a laminated structure.

During this operation, air is circulated in a manner described above in the airgap 39 which is maintained between the inner and outer dies. Where desired, an auxiliary stream of air or other gas under pressure may serve as a coolant and be circulated through the airgap 39. In this case, a pumping means and conduit means (not shown) would be employed to circulate the air, or other coolant. In addition, if it is desired, a reactive gas which may serve to further activate the surfaces of the respective layers being extruded may also be circulated through airgap 39 into the space between the layers of tubing coming out of orifices 13 and 19. In this position, the reactive atmosphere will serve to activate the adjacent layers of the laminated tube to insure better bonding. In another procedure, which is preferred, where a reactive gas is employed, it is preferably introduced into the space between the tubes coming out of orifices 13 and 19 through horizontally disposed conduits 49 that are cut in the wall of cylinder 38. In this case, the sealing ring 47 would have to be removed. The source of reactive gas (not shown) in this instance would be connected to the inner ends of conduits 49.

A number of reactive gases are known in the prior art which will serve this purpose. Typical among these are the halogens such as bromine, iodine and fluorine, as well as such materials as ozone, oxides of nitrogen, sulfuryl chloride, etc.

This invention has been described with particular reference to the formation of laminated tubes. However, it also lends itself to the production of laminated sheet material. In this instance, the extrusion process is the same as far as the preparation of tubes. However, instead of being merely blown into tubes by means of the compressed air, the extruded material is blown into the form of large balloons in a manner well known to those skilled in this art. These balloons are then cut to provide sheets of the desired laminated structure.

Although this invention is illustrated with reference to the formation of laminated tubes made of two layers, it is to be understood that with the appropriate modifications, well within the knowledge of one skilled in this art, the process and device of this inventor may be used to prepare laminates containing more than two layers.

Any of a variety of plastic resins well known in this art may be used in carrying out the process of the present invention. Among these may be mentioned polyethylenes of various degrees of density (low, medium and high); copolymers of polyethylene and methacrylic acid; homopolymers of vinylidene chlorides; terpolymers of vinylidene chloride, vinyl chloride and esters of acylic acid, e.g., methyl acrylate; homopolymers of vinyl chloride; propylene modified vinyl chloride polymers; polyamide resins (e.g.) nylon, etc. These plastic resins may constitute either the inner or the outer layer of the laminated tube formed in this invention.

The process of this invention is ordinarily used to produce laminates which are two layers thick and are tubular in configuration. The thickness of the respective layers may vary somewhat. However, in the usual case, the thickness of the outside layer will range from about 6 to 8 mils. The inside layers will vary between 3 to 5 mils in thickness, the overall thickness of the tube being about 12 to 18 mils.

The following examples are further illustrative of the present invention. It should be understood, however, that the invention is not limited thereto.

EXAMPLE 1

Using the device shown in FIG. 1, a melt of medium density (.93) polyethylene (average M.W. 30,000) was introduced into outer die 3 through first vertical feed channel 7. Die 3 is heated to and maintained in the temperature range of 210° to 225°C.

Simultaneously, polyvinylidene chloride resin (M.W. 44,000±8,000) is injected as a melt into inner die 5 through rear port 25. It enters conduit 21 and finally leaves inner die 5 by means of circular orifice 19. Inner die 5 was heated to and maintained at a temperature in the range of from 130° to 140° C. Air at a pressure in the range of from 3 to 4 p.s.i., was introduced into second vertical feed channel 29.

The flow of the polyethylene resin is such that thickness of the tube extruded from circular orifice 13 is within the range of from 8 to 11 mils. The flow of said polyvinylidene chloride resin is controlled so that the thickness of the tube being extruded from circular orifice 19 is maintained in the range of from about 3 to about 5 mils. The overall thickness of the laminated tube obtained falls in the range of from about 12 to 18 mils. Under these conditions, the temperature of the polyethylene melt as it is extruded through circular orifice 13, is in the range of about 240° to 265° C. The temperature of the polyvinylidene chloride polymer melt extruded through circular orifice 19 is in the range of 150° to 155° C.

In this operation, air from the atmosphere was permitted to circulate through airgap 39 of separator 37. This was sufficient to maintain the proper temperature gradient between outer die 3 and inner die 5. In addition, the gasses generated by the hot resin melts that collect in the space between the extruding tubes in front of the die face 11 are bled off through conduits 49 and the airgap 39 of separator 37. In this operation, therefore, sealing ring 47 is removed.

EXAMPLE 2

In this run, the procedure and conditions of Example 1 was followed, excepting that a stream of fluorine gas is injected through conduit 49 of separator 37 between the layers of the laminated tubes as they are being extruded. This is a reactive gas and serves to further insure the bonding of the materials together.

EXAMPLE 3

The procedure and conditions of Example 1 were followed, excepting that in place of the medium density polyethylene, there is employed an ethylene/methacrylic acid copolymer containing 10 percent by weight methacrylic acid ionically cross-linked with sodium hydroxide until 76 percent of the carboxyl group is neutralized (melt index 0.65 g./10 min.). (See U.S. Pat. No. 3,264,272). In this case, outer die 3 is maintained at a temperature between about 250° to 270° C. The melt temperature, as it leaves this die, is in the range of about 305° to 315°C.

EXAMPLE 4

The procedure and conditions of Example 1 were followed, excepting that in place of polyvinylidene chloride resin mentioned therein, the sodium cross-linked ethylene/methacrylic acid copolymer described in Example 3, is employed. In this case, inner die 5 is maintained in the temperature range of 250° to 270° C. and the melt temperature of this material, as it leaves inner die 5, is in the range of about 305° to 315°C.

EXAMPLE 5

The procedure and conditions of Example 1 were followed, excepting that in place of the medium density polyethylene, plasticized polyvinyl chloride homopolymer was employed. In this case, outer die 3 is maintained at a temperature in the range of 155° to 160° C. The melt temperature of the tube of polyvinyl chloride, as it is extruded from circular orifice 13, is in the range of about 170° to 177°C.

EXAMPLE 6

The procedure and conditions of Example 1 were followed, excepting that in place of the medium density polyethylene, there is employed a propylene-modified polyvinyl chloride, which may be expressed by the general formula:

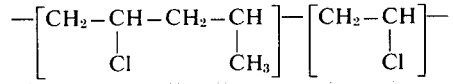

This material contains about 3 to 5 percent by weight of propylene, the balance being vinyl chloride and has inherent viscosity of .68. In this case, outer die 3 is maintained at a temperature of about 180° C. The melt temperature of the tube of this material, as it is extruded from circular orifice 13, is about 205° C.

Although the invention has been described with reference to specific forms thereof, it will be understood that many changes and modifications may be made without departing from the spirit of this invention.

What is claimed is:

1. A split extrusion die adapted to extrude laminated, seamless, plastic tubing in which separate tubular layers of said laminate are made of different plastic materials comprising outer and inner dies, said outer and inner dies terminating in separate outer and inner extrusion orifices which are concentrically arranged with respect to each other; said outer and inner dies being maintained in spaced relation with respect to each other by separator means interposed between said dies and defining therebetween a space gap, said separator means occupying at most only a minor portion of said space gap and contacting said dies at most at only a limited number of places thereby forming an insulating space between said outer and inner dies whereby a temperature gradient may be maintained between said dies, said split extrusion die having separate outer and inner die plastic feeding means; and said separator means comprising a hollow cylindrical body portion and lug means distributed on at least one surface of said hollow cylindrical body portion, said lug means serving to keep said outer and inner dies in spaced relation with respect to each other and providing a space gap therebetween.

2. A split extrusion die adapted to extrude laminated, seamless, plastic tubing in which separate tubular layers of said laminate are made of different plastic materials comprising outer and inner dies, said outer and inner dies terminating in separate outer and inner extrusion orifices which are concentrically arranged with respect to each other; said outer and inner dies being maintained in spaced relation with respect to each other by separator means interposed between said dies and defining therebetween a space gap, said separator means occupying at most only a minor portion of said space gap and contacting said dies at most at only a limited number of places thereby forming an insulating space between said outer and inner dies whereby a temperature gradient may be maintained between said dies, said split extrusion die having separate outer and inner die plastic feeding means, said separator means comprising a hollow cylindrical body portion and lug means distributed on at least one surface of said hollow cylindrical body portion, said lug means serving to keep said outer and inner dies in spaced relation with respect to each other and providing a space gap therebetween and comprising a plurality of lugs radially disposed at each end of said hollow cylindrical body portion.

3. A split die according to claim 1 including gas conduit means terminating in an orifice which is centrally disposed with respect to said inner annular extrusion orifice, said gas conduit means being disposed so as to introduce gas under pressure into the interior of a tubular layer issuing from said inner annular orifice during its extrusion, whereby the inner tubular layer is forced into contact with a tubular layer issuing from said outer annular orifice to insure the bonding of the tubular layers together to form said laminated tube.

4. A split die according to claim 3 including means for heating said inner and outer dies to different temperatures.

5. A split die according to claim 3 including means for circulating coolant through said space gap under pressure.

6. A split die according to claim 3 including baffle means disposed in said inner die plastic material feeding means said baffle means momentarily serving to divide the stream of plastic material flowing in the inner die plastic material feeding means.

* * * * *